(12) United States Patent
Mori et al.

(10) Patent No.: US 12,044,554 B2
(45) Date of Patent: Jul. 23, 2024

(54) ANGLE DETECTION DEVICE, AND ELECTRIC POWER STEERING DEVICE USING SAME

(71) Applicant: Mitsubishi Electric Corporation, Tokyo (JP)

(72) Inventors: Tatsuya Mori, Tokyo (JP); Akira Furukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 735 days.

(21) Appl. No.: 17/271,653

(22) PCT Filed: Dec. 18, 2018

(86) PCT No.: PCT/JP2018/046482
§ 371 (c)(1),
(2) Date: Feb. 26, 2021

(87) PCT Pub. No.: WO2020/129144
PCT Pub. Date: Jun. 25, 2020

(65) Prior Publication Data
US 2021/0323603 A1  Oct. 21, 2021

(51) Int. Cl.
*G06F 11/30* (2006.01)
*B62D 5/04* (2006.01)
(Continued)

(52) U.S. Cl.
CPC ............ *G01D 5/244* (2013.01); *B62D 5/046* (2013.01); *B62D 6/002* (2013.01); *B62D 15/021* (2013.01)

(58) Field of Classification Search
CPC ..................................... G01D 5/244
See application file for complete search history.

(56) References Cited

U.S. PATENT DOCUMENTS

2014/0316733 A1\* 10/2014 Mori ................. G01D 5/00
702/94
2014/0354271 A1  12/2014 Kawase

FOREIGN PATENT DOCUMENTS

| JP | 2008-273478 A | 11/2008 |
| JP | 2009-014358 A | 1/2009 |

(Continued)

OTHER PUBLICATIONS

Communication dated Jan. 5, 2022 from the Japanese Patent Office in Application No. 2020-560670.

(Continued)

*Primary Examiner* — Phuong Huynh
(74) *Attorney, Agent, or Firm* — Sughrue Mion, PLLC; Richard C. Turner

(57) ABSTRACT

A second n-fold angle signal is calculated using a first sine wave signal and a second sine wave signal obtained from a first n-fold angle signal that is an angle signal multiplied by n (n is a real number other than 1), offset correction values of the first sine wave signal and the second sine wave signal respectively are calculated from the second n-fold angle signal, the first sine wave signal is corrected by the calculated offset correction value of the first sine wave signal being added to the first n-fold angle signal, and the second n-fold angle signal is corrected by the calculated offset correction value of the second sine wave signal being added to the second sine wave signal.

19 Claims, 12 Drawing Sheets

(51) Int. Cl.
  *B62D 6/00*   (2006.01)
  *B62D 15/02*  (2006.01)
  *G01D 5/244*  (2006.01)

(56) References Cited

FOREIGN PATENT DOCUMENTS

| JP | 2015-132593 A | | 7/2015 | |
|---|---|---|---|---|
| JP | 2015132593 A | * | 7/2015 | ........... G01D 5/2451 |
| JP | 5762622 B2 | | 8/2015 | |
| WO | 2013/136612 A1 | | 9/2013 | |
| WO | WO-2013136612 A1 | * | 9/2013 | ............. G01B 21/22 |

OTHER PUBLICATIONS

International Search Report for PCT/JP2018/046482 dated Mar. 12, 2019.

\* cited by examiner

ANGLE DETECTION DEVICE, AND ELECTRIC POWER STEERING DEVICE USING SAME

CROSS-REFERENCE TO RELATED APPLICATIONS

This application is a National Stage of International Application No. PCT/JP2018/046482 filed Dec. 18, 2018.

TECHNICAL FIELD

The present application relates to an angle detection device, and to an electric power steering device in which the angle detection device is used.

BACKGROUND ART

In general, a resolver or an MR (magnetoresistance) sensor is widely used as an angle detector that detects an angle of rotation of a rotating machine, for example, a motor. These angle detectors are such that a sine signal and a cosine signal in accordance with a motor angle of rotation are output, but when an error (an offset component or a harmonic component) is included in the sine signal or the cosine signal, or when amplitude values of the sine signal and the cosine signal differ, a detected angle value obtained from the sine signal and the cosine signal has an error with respect to an actual motor angle of rotation, because of which a problem occurs in that a motor control performance is caused to worsen.

In response to this, Patent Literature 1 discloses an angle detection device wherein a center point correction value of a sine signal and a cosine signal of a resolver is stored in advance in an EEPROM (electrically erasable programmable read-only memory) or the like, or a peak value and a trough value of a sine signal and a cosine signal are read, a center point correction value is obtained from a difference between a center point of the peak value and the trough value and a preset predetermined center point value, a correction is implemented by adding the center point correction value to the sine signal and the cosine signal, and a motor angle signal is calculated from the corrected sine signal and cosine signal.

Also, Patent Literature 2 discloses an angle detection device wherein an offset correction value with respect to a sine signal and a cosine signal is obtained using an angle error wherein a frequency component lower than an electrical angle frequency component of an angle signal is removed from the angle signal, and a component equal to or higher than the frequency of the electrical angle frequency component is extracted, whereby, even when a secondary component occurs in addition to a center point error in the sine signal and the cosine signal, an electrical angle frequency component of the angle signal caused by the secondary component and the center point error can be corrected.

CITATION LIST

Patent Literature

Patent Literature 1: JP-A-2008-273478
Patent Literature 2: Japanese Patent No. 5,762,622

SUMMARY OF INVENTION

Technical Problem

The angle detection device disclosed in Patent Literature 1 is such that when a harmonic component exists in the sine signal and the cosine signal, or when orthogonality is low, there is a problem in that an angle error (which is a discrepancy between a detected angle value and a motor angle of rotation) occurring as a result thereof cannot be corrected. Herein, orthogonality indicates an index of deviation of a phase difference between the sine signal and the cosine signal from 90 degrees, which is ideal, and means that the phase difference between the sine signal and the cosine signal is in a vicinity of 90 degrees when orthogonality is high, and the phase difference between the sine signal and the cosine signal is deviating from 90 degrees when orthogonality is low.

Also, the angle detection device disclosed in Patent Literature 2 is such that although an electrical angle frequency component of an angle signal can be corrected well, there is no advantage with respect to a component of another order.

The present application discloses technology for resolving the aforementioned kinds of problem, and has an object of providing an angle detection device such that an angle error is restricted even when a harmonic component exists in a sine signal or a cosine signal or when orthogonality is low, and with respect to an angle signal component of an order other than that of an electrical angle frequency component, and of providing an electric power steering device in which the angle detection device is used.

Solution to Problem

An angle detection device disclosed in the present application is an angle detection device that outputs a detected angle value from an angle signal of a rotating body, and includes an angle corrector that carries out each of an operation obtaining a first n-fold angle signal by multiplying the angle signal by n (n is a real number other than 1), an operation obtaining, based on the first n-fold angle signal, a first sine wave signal and a second sine wave signal of mutually differing phases, an operation obtaining a second n-fold angle signal based on the first sine wave signal and the second sine wave signal, an operation obtaining a first offset correction value, which is an offset correction value of the first sine wave signal, based on the second n-fold angle signal and obtaining a second offset correction value, which is an offset correction value of the second sine wave signal, based on the second n-fold angle signal, and an operation correcting the second n-fold angle signal based on the first sine wave signal corrected by the first offset correction value and the second sine wave signal corrected by the second offset correction value, wherein the angle correction device outputs the detected angle value based on the corrected second n-fold angle signal.

Advantageous Effects of Invention

According to the angle detection device disclosed in the present application, an angle detection device such that an angle error is restricted even when a harmonic component exists in a sine signal and a cosine signal or when orthogonality is low, and with respect to an angle signal component of an order other than that of an electrical angle frequency component, can be provided.

The foregoing and other objects, features, aspects, and advantages of the present application will become more apparent from the following detailed description of the present application when taken in conjunction with the accompanying drawings.

DESCRIPTION OF EMBODIMENTS

Figure 1:
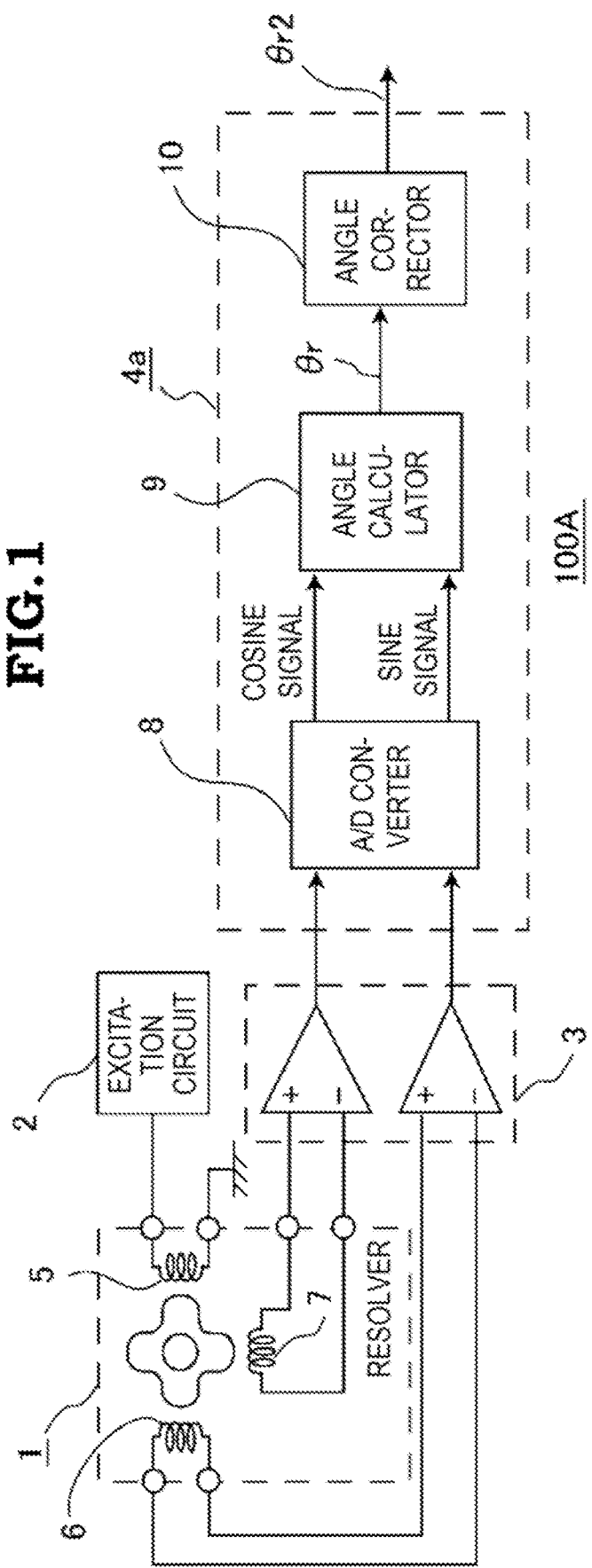
FIG. 1 is a block diagram showing a configuration of an angle detection device according to a first embodiment.

Hereafter, preferred embodiments of an angle detection device according to the present application, and of an electric power steering device in which the angle detection device is used, will be described using the drawings. In the drawings, identical reference signs indicate identical or corresponding portions.

First Embodiment

FIG. 1 is a block diagram showing a configuration of an angle detection device according to a first embodiment. In FIG. 1, an angle detection device 100A includes a resolver 1, an excitation circuit 2, a differential amplifier 3, and angle calculating means 4a. The resolver 1 is configured of an excitation coil 5, a sine detecting coil 6 that detects a sine of an angle of a motor (not shown), and a cosine detecting coil 7 that detects a cosine of an angle of the motor.

Figure 2A:
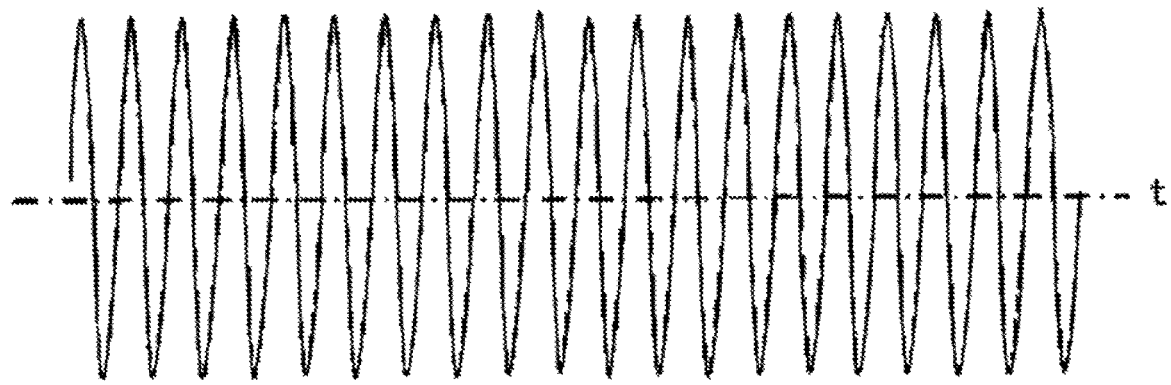
FIG. 2A is a drawing showing a signal supplied to an excitation coil of a resolver shown in FIG. 1.
Figure 2B:
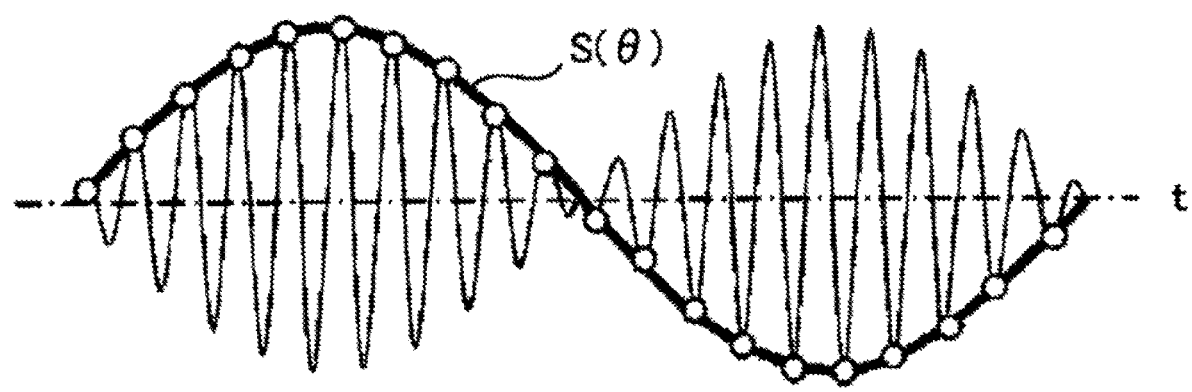
FIG. 2B is a drawing showing an output signal of a sine detecting coil of the resolver shown in FIG. 1.

By the excitation coil 5 being driven using an alternating current signal shown in FIG. 2A, the resolver 1 outputs a sine signal $S(\theta)$ amplitude modulated using the sine of the angle of the motor shown in FIG. 2B to an output end of the sine detecting coil 6. Also, the resolver 1 outputs a cosine signal $C(\theta)$ amplitude modulated using the cosine of the angle of the motor shown in FIG. 2C to an output end of the cosine detecting coil 7. Also, a horizontal axis in each of FIG. 2A, FIG. 2B, and FIG. 2C indicates a time axis (time t), and represents a period of one angle cycle of the resolver 1. Vertical axes indicate the amplitudes of the signals.

The angle detecting means 4a includes an A/D converter 8 that has an output of the differential amplifier 3 as an input, an angle calculator 9 that has the sine signal $S(\theta)$ and the cosine signal $C(\theta)$, which are outputs of the A/D converter 8, as inputs, and an angle corrector 10 that has an angle signal $\theta_r$ output from the angle calculator 9 as an input.

The angle detection device 100A is configured as heretofore described, and next, a method of processing a signal output from the resolver 1 will be described.

The excitation coil 5 of the resolver 1 is driven by the excitation circuit 2 using the alternating current signal shown in FIG. 2A. A difference in voltages between the two output ends of the sine detecting coil 6 of the resolver 1 and in voltages between the two output ends of the cosine detecting coil 7 is amplified by the differential amplifier 3, and output to the angle calculating means 4a.

Figure 2C:
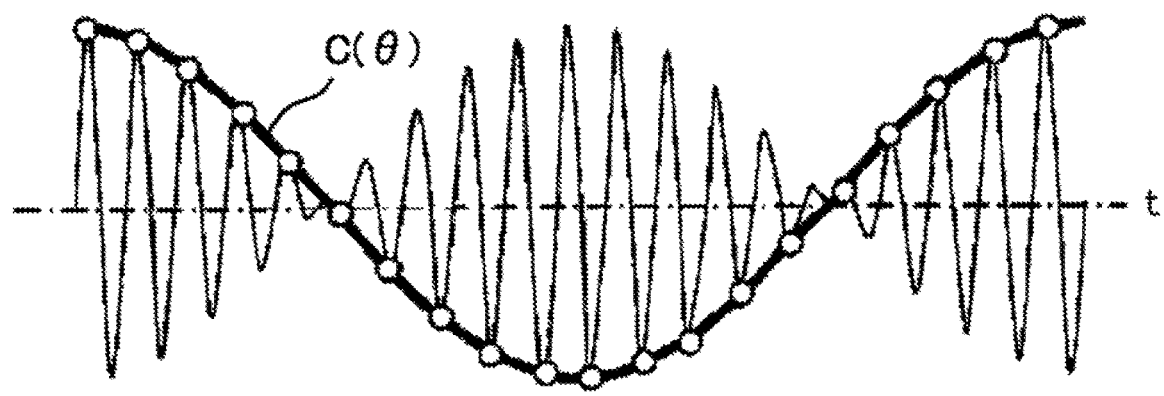
FIG. 2C is a drawing showing an output signal of a cosine detecting coil of the resolver shown in FIG. 1.

The angle calculating means 4a carries out an A/D conversion of peak points of sine values and cosine values indicated by circles in FIG. 2B and FIG. 2C, that is, peak points of sine values and cosine values detected by the differential amplifier 3, using the A/D converter 8, and obtains the sine signal $S(\theta)$ indicated by a bold line in FIG. 2B and the cosine signal $C(\theta)$ indicated by a bold line in FIG. 2C from a signal sequence in which the peak points are strung out. $\theta$ is an angle of rotation of the motor. Further, the sine signal $S(\theta)$ and the cosine signal $C(\theta)$, which are outputs of the A/D converter 8, are input into the angle calculator 9. An inverse tangent operation (an arctangent operation) is carried out on the sine signal $S(\theta)$ and the cosine signal $C(\theta)$ in the angle calculator 9, and a result thereof is output to the angle corrector 10 as the angle signal $\theta_r$ of the motor. The angle corrector 10 inputs the angle signal $\theta_r$ output from the angle calculator 9, and outputs a detected angle value erg using an operation to be described hereafter. As an output of the angle corrector 10 is also an output of the angle calculating means 4a, the angle calculating means 4a outputs the detected angle value $\theta_{r2}$.

Next, an operation carried out in the angle corrector 10 will be described, based on FIG. 3.

The angle corrector 10 is configured to include a first multiplier 101, a sine unit 102, a cosine unit 103, an adder 104, a tripled angle calculator 105, an offset correction value calculator 106, a second multiplier 107, and an offset angle calculator 108.

Figure 4:
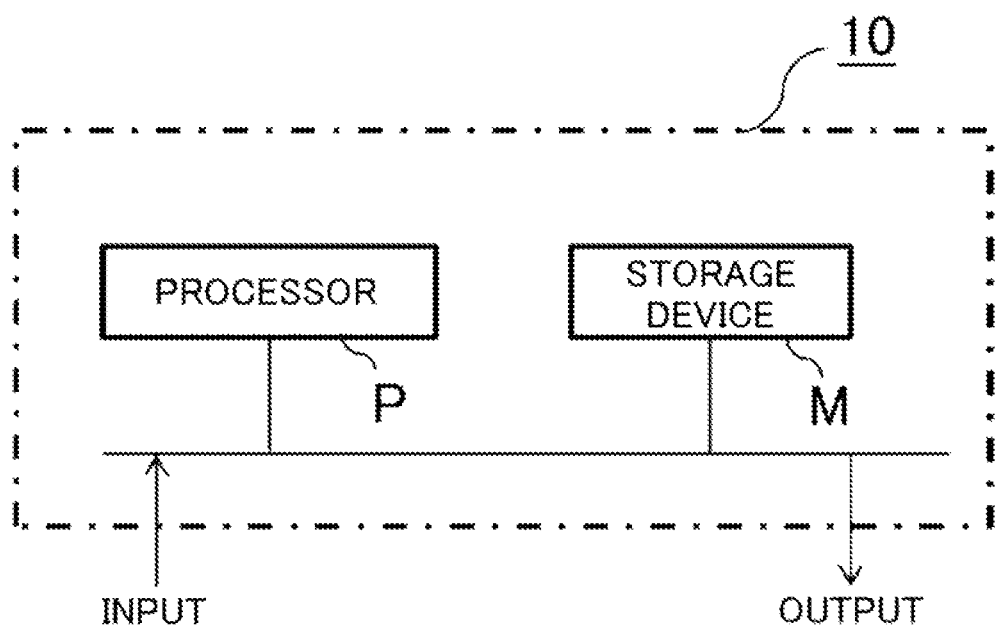
FIG. 4 is a drawing showing an example of hardware of the angle corrector of the angle detection device according to the first embodiment.

The angle corrector 10 is configured of a processor P and a storage device M, as in a hardware example shown in FIG. 4. Although not shown in the drawing, the storage device M includes a volatile storage device such as a random-access memory and a non-volatile auxiliary storage device such as a flash memory. Also, the storage device M may include a hard disk auxiliary storage device instead of a flash memory.

The processor P executes a program input from the storage device M. In this case, the program is input into the processor P from the auxiliary storage device via the volatile storage device. Also, the processor P may output data such as an operation result to the volatile storage device of the storage device M, or may save the data in the auxiliary storage device via the volatile storage device.

Figure 5:
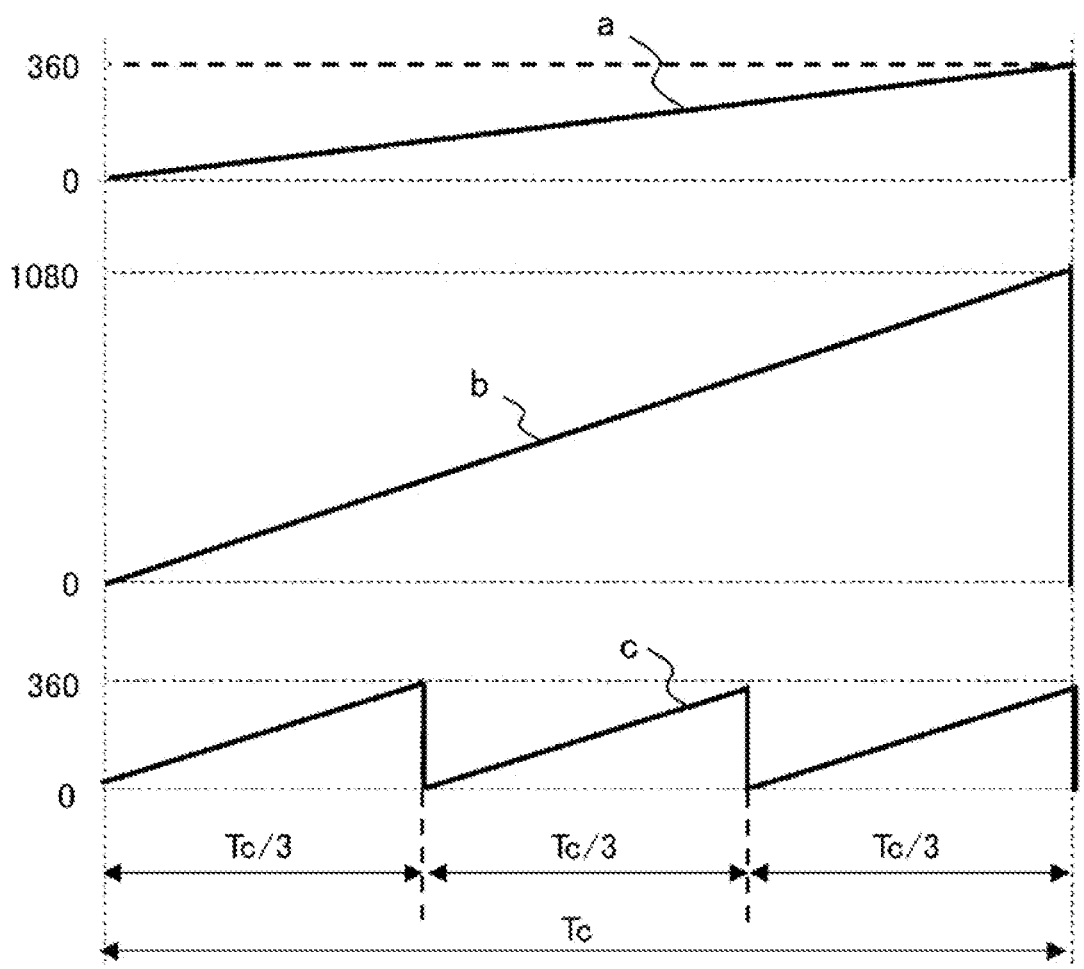
FIG. 5 is a drawing illustrating an operation of a first multiplier provided in the angle detection device according to the first embodiment.

The first multiplier 101 triples and outputs the angle signal $\theta_r$ output from the angle calculator 9. This output value is defined as a first tripled angle signal $3\theta_r$. As the first tripled angle signal $3\theta_r$ is simply such that the angle signal $\theta_r$ is tripled, it is depicted as in b of FIG. 5, and while a in FIG. 5 increases from 0 degrees to 360 degrees in a cycle $T_c$, the first tripled angle signal $3\theta_r$ increases from 0 degrees to 1,080 degrees (360 degrees tripled). Herein, when an angle value range is defined as from 0 degrees to less than 360 degrees, α degrees+360 degrees×n (n is an integer)=α degrees is established when α is a real number equal to or greater than 0 and less than 360, because of which the first tripled angle signal $3\theta_r$ can be represented as in c of FIG. 5, and the first tripled angle signal $3\theta_r$ can be thought of as being an angle signal of one-third of a cycle (a tripled frequency) with respect to the cycle of the angle signal $\theta_r$. FIG. 5 is a drawing illustrating an operation of the first multiplier 101, and shows the cycle $T_c$ on a horizontal axis, and the angle signal $\theta_r$ on a vertical axis.

Next, the sine unit 102 outputs a sine value with respect to the first tripled angle signal $3\theta_r$. The output of the sine unit 102 is a first sine wave signal $S(3\theta_r)$. The cosine unit 103 outputs a cosine value with respect to the first tripled angle signal $3\theta_r$. The output of the cosine unit 103 is a second sine wave signal $C(3\theta_r)$.

The adder 104 adds the first sine wave signal $S(3\theta_r)$ and a first offset correction value es calculated by the offset correction value calculator 106, to be described hereafter, and adds the second sine wave signal $C(3\theta_r)$ and a second offset correction value ec calculated by the offset correction value calculator 106, to be described hereafter, and outputs the results to the tripled angle calculator 105. The tripled angle calculator 105 carries out an inverse tangent (arctangent) operation on the first sine wave signal to which the first offset correction value es has been added ($S(3\theta_r)$+es) and the second sine wave signal to which the second offset correction value ec has been added ($C(3\theta_r)$+ec), and outputs a second tripled angle signal $3\theta_{r2}$, and the second multiplier 107 multiplies the second tripled angle signal $3\theta_{r2}$ by one-third, and outputs the result to the offset angle calculator 108.

The offset angle calculator 108, based on the angle signal $\theta_r$, offsets the second tripled angle signal $3\theta_{r2}$ multiplied by one-third using the second multiplier 107. Specifically, when value ranges of the angle signal $\theta_r$ are 0 degrees to less than 120 degrees, 120 degrees to less than 240 degrees, and 240 degrees to less than 360 degrees, offset values of the second tripled angle signal $3\theta_{r2}$ multiplied by one-third using the second multiplier 107 are 0 degrees, 120 degrees, and 240 degrees respectively. An output of the offset angle calculator 108 is a calculated angle value $\theta_{r2}$.

Continuing, the offset correction value calculator 106 will be described. The offset correction value calculator 106 inputs the second tripled angle signal $3\theta_{r2}$ output from the tripled angle calculator 105, and outputs the first offset correction value es and the second offset correction value ec. Hereafter, an operation of the offset correction value calculator 106 will be described in detail.

Figure 6:
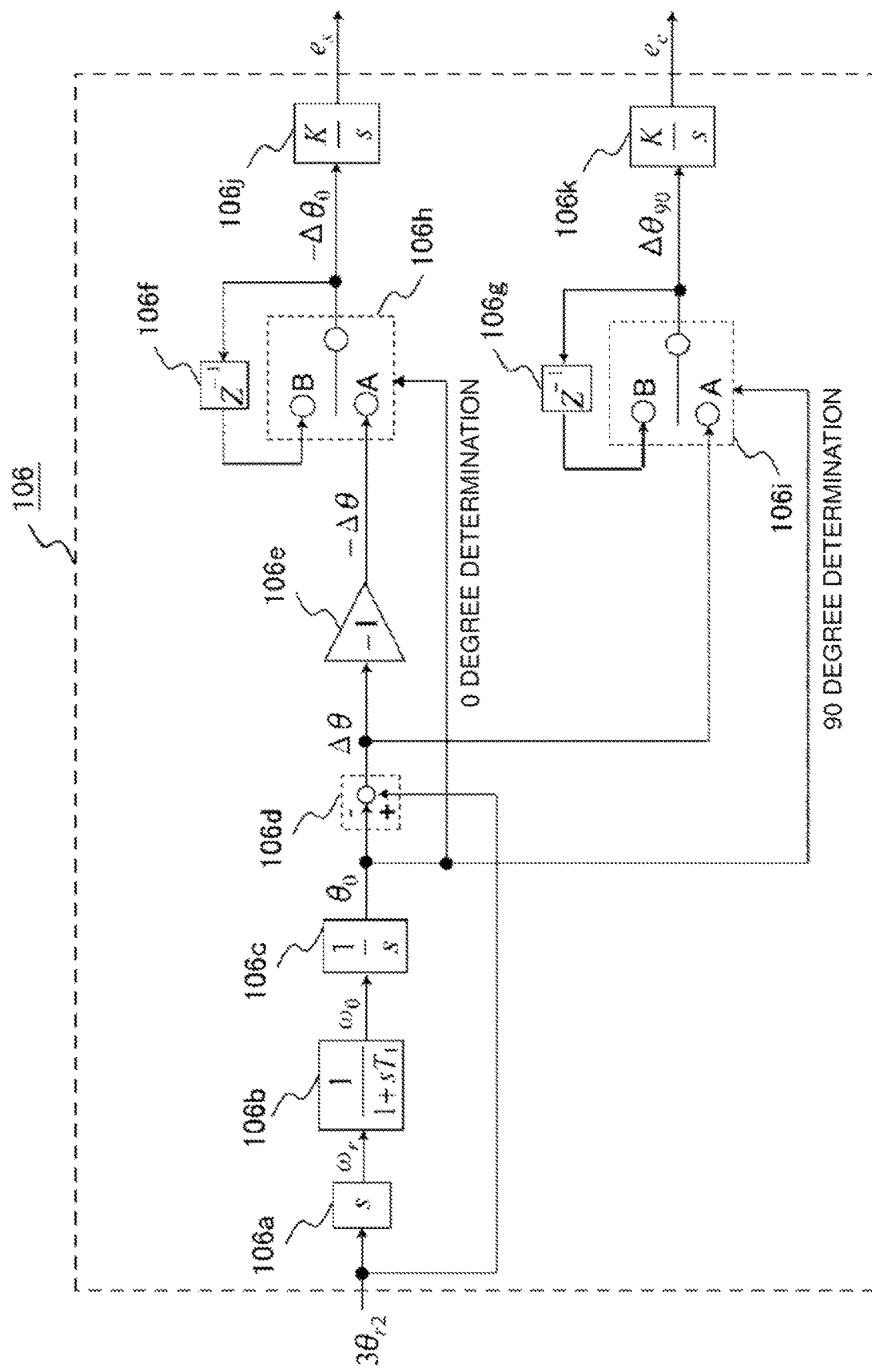
FIG. 6 is a drawing illustrating a function of an offset correction value calculator of the angle detection device according to the first embodiment.

FIG. 6 is a drawing showing an overall configuration of the offset correction value calculator 106. The offset correction value calculator 106 includes a differentiator 106a, a low-pass filter 106b, a first integrator 106c, a subtractor 106d, and a gain unit 106e. Furthermore, the offset correction value calculator 106 includes a first delayer 106f, a second delayer 106g, a first switch 106h, a second switch 106i, a second integrator 106j, and a third integrator 106k.

The differentiator 106a carries out a differentiating operation with respect to the second tripled angle signal $3\theta_{r2}$, thereby calculating a first speed signal $\omega_r$. Herein, s in the drawing is a reference sign representing a Laplacian operator. The low-pass filter 106b outputs a second speed signal $\omega_o$ wherein a frequency component higher than a time constant $T_1$ has been removed from the first speed signal $\omega_r$. The time constant $T_1$ is set to a value that blocks a basic wave frequency of the first sine wave signal $S(3\theta_r)$ of the second tripled angle signal $3\theta_{r2}$. Therefore, the second speed signal $\omega_o$ is such that a frequency component equal to or higher than the basic wave frequency of the first sine wave signal $S(3\theta_r)$ has been blocked. Herein, the low-pass filter 106b is a primary filter, but provided that the filter is such that a frequency component equal to or higher than the basic wave frequency is blocked, the same advantage is obtained even when a secondary or later filter is adopted.

The first integrator 106c outputs a high cutoff frequency angle signal $\theta_0$ obtained by integrating the second speed signal $\omega_o$. As the high cutoff frequency angle signal $\theta_0$ is obtained by integrating the second speed signal $\omega_o$, the high cutoff frequency angle signal $\theta_0$ is an angle signal wherein a frequency component equal to or higher than the basic wave frequency of the first sine wave signal $S(3\theta_r)$ has been removed from the second tripled angle signal $3\theta_{r2}$. The subtractor 106d subtracts the high cutoff frequency angle signal $\theta_0$ from the second tripled angle signal $3\theta_{r2}$, and calculates an n-fold angle error $\Delta\theta$ wherein a frequency component lower than the basic wave frequency of the first sine wave signal $S(3\theta_r)$ included in the second tripled angle signal $3\theta_{r2}$ has been removed. The gain unit 106e, on inputting the n-fold angle error $\Delta\theta$, outputs an inverted sign value $-\Delta\theta$ of the angle error, which is the n-fold angle error $\Delta\theta$ multiplied by $-1$. In the first delayer 106f and the second delayer 106g, z in the drawing represents an operator representing a z-conversion, and the first delayer 106f and the second delayer 106g output a signal input one operating cycle previously.

The first switch 106h has two inputs A and B, outputs the input A (the inverted sign value $-\Delta\theta$ of the n-fold angle error) when it is determined that the high cutoff frequency angle signal $\theta_0$ has passed a vicinity of 0 degrees, and outputs the input B (the value of the output of the first switch 106h one operating cycle previously) at other times. Therefore, the first switch 106h outputs an inverted sign value $-\Delta\theta_0$ of the n-fold angle error when the high cutoff frequency angle signal $\theta_0$ passes a vicinity of 0 degrees, and this is updated every time the high cutoff frequency angle signal $\theta_0$ passes a vicinity of 0 degrees. Also, the second switch 106i has two inputs A and B, outputs the input A (the n-fold angle error $\Delta\theta$) when it is determined that the high cutoff frequency angle signal $\theta_0$ has passed a vicinity of 90 degrees, and outputs the input B (the value of the output of the second switch 106i one operating cycle previously) at other times. Therefore, the second switch 106i outputs an n-fold angle error $\Delta\theta_{90}$ when the high cutoff frequency angle signal $\theta_0$ passes a vicinity of 90 degrees, and this is updated every time the high cutoff frequency angle signal $\theta_0$ passes a vicinity of 90 degrees.

The second integrator 106j outputs a value resulting from integrating and outputting the inverted sign value $-\Delta\theta_0$ of the n-fold angle error as an offset correction value of the first sine wave signal $S(3\theta_r)$, that is, the first offset correction value es. In the same way, the third integrator 106k outputs a value resulting from integrating and outputting the n-fold angle error $\Delta\theta_{90}$ as an offset correction value of the second sine wave signal $C(3\theta_r)$, that is, the second offset correction value ec. Herein, K in the drawing is feedback gain, and by this being regulated, operating responses of the first offset correction value es, which is the offset correction value of the first sine wave signal $S(3\theta_r)$, and the second offset correction value ec, which is the offset correction value of the second sine wave signal $C(3\theta_r)$, are regulated from the second tripled angle signal $3\theta_{r2}$.

Next, advantages of the angle detection device 100A according to the first embodiment will be described in detail. The angle signal $\theta_r$ is expressed in the following Equation (1).

$$\theta_r = \theta + \theta_{err} \cdot \sin(3\theta + \beta) \tag{1}$$

Figure 7A:
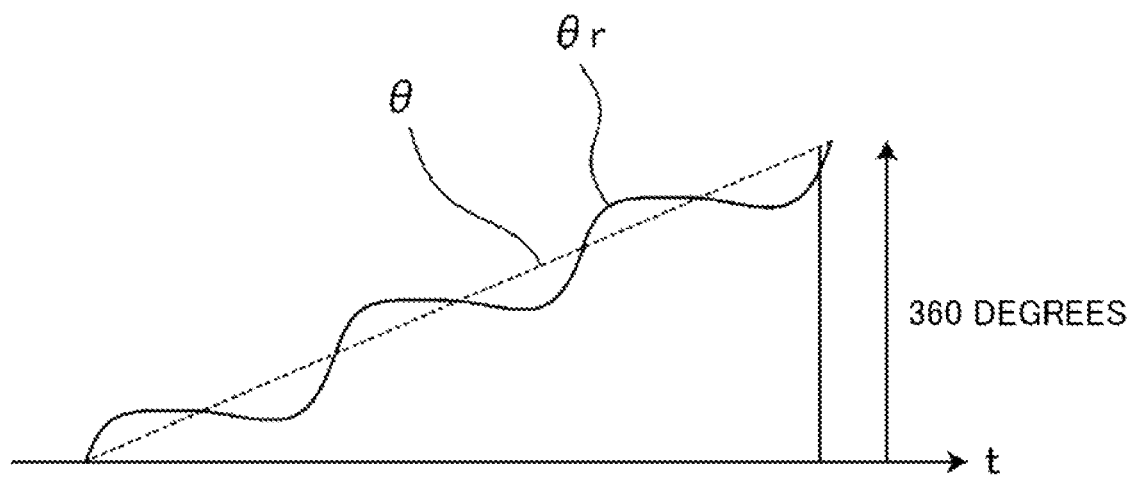
FIG. 7A is a drawing illustrating an advantage of the angle detection device according to the first embodiment.

Herein, $\theta_{err}$ is an amplitude of a component that fluctuates at a frequency three times that of the motor angle of rotation $\theta$ included in the angle signal $\theta_r$. A correction in a case wherein a harmonic (tertiary in this case) component with respect to the motor angle of rotation $\theta$ is included in the angle signal $\theta_r$ in this way, as shown in FIG. 7A, will be considered. FIG. 7A shows a case wherein the angle signal $\theta_r$ indicated by a solid line includes three cycles of fluctuation with respect to the motor angle of rotation $\theta$ indicated by a dotted line while changing from 0 to 360 degrees.

Figure 3:
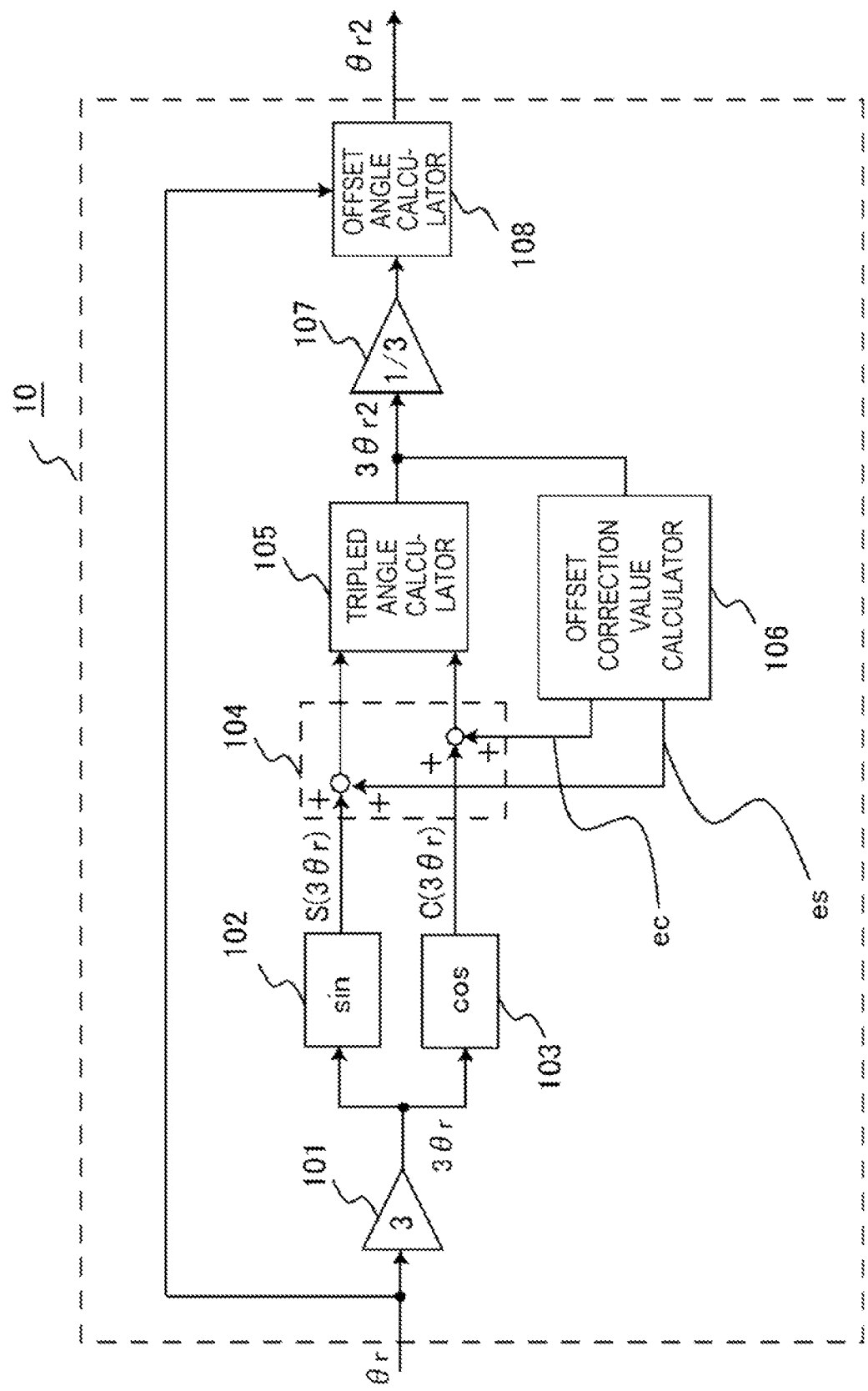
FIG. 3 is a drawing illustrating a function of an angle corrector of the angle detection device according to the first embodiment.

The angle signal $\theta_r$ is tripled in the first multiplier 101 shown in FIG. 3, whereby the first tripled angle signal $3\theta_r$ is obtained. When this operation is substituted into Equation (1), the following Equation (2) results.

$$3\theta_r = 3\theta + 3\theta_{err} \cdot \sin(3\theta + \beta) \tag{2}$$

Figure 7B:
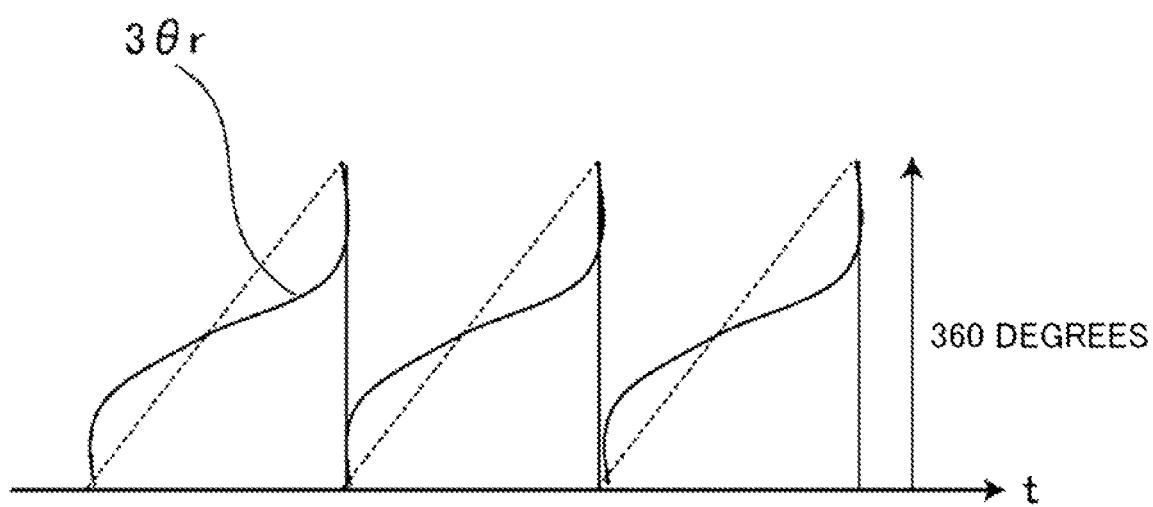
FIG. 7B is a drawing illustrating an advantage of the angle detection device according to the first embodiment.

Herein, as shown in FIG. 5, the first tripled angle signal $3\theta_r$ is a signal of three times the frequency (one-third of the cycle) of the angle signal $\theta_r$. Therefore, the first tripled angle signal $3\theta_r$ and an angle error (the second item on the right side of Equation (2)) that fluctuates at a tripled frequency with respect to the motor angle of rotation $\theta$ have the same cycle (frequency). Therefore, it is understood that the cycle of the angle error and the cycle of the first tripled angle signal $3\theta_r$ coincide, as shown in FIG. 7B. Horizontal axes of FIG. 7A and FIG. 7B indicate time axes.

Next, a sine value (the first sine wave signal $S(3\theta_r)$) and a cosine value (the second sine wave signal $C(3\theta_r)$) with respect to the second tripled angle signal $3\theta_{r2}$ are obtained by the sine unit 102 and the cosine unit 103, the first offset correction value es and the second offset correction value ec are added thereto in the adder 104, and the second tripled angle signal $3\theta_{r2}$ is obtained using the tripled angle calculator 105. Herein, when no angle error is included in the first tripled angle signal $3\theta_r$, that is, when $3\theta_r$ coincides with $3\theta$, an angle difference $\Delta\theta1$ between the second tripled angle signal $3\theta_{r2}$ and the first tripled angle signal $3\theta_r$ when the first offset correction value es and the second offset correction value ec are added is as in the following Equation (3).

$$\Delta\theta1 = ec \cdot \cos(3\theta) - ec \cdot \sin(3\theta) \tag{3}$$

Therefore, an angle error synchronous with (having the same cycle as) the first tripled angle signal $3\theta_r$ can be superimposed on the second tripled angle signal $3\theta_{r2}$, with respect to the first tripled angle signal $3\theta_r$, using the first offset correction value es and the second offset correction value ec.

Next, a case wherein the first tripled angle signal $3\theta_r$ includes an error with respect to the motor angle of rotation $\theta$, as expressed in Equation (2), will be considered. When Equation (2) is expanded, the following Equation (4) results.

$$3\theta_r = 3\theta + 3\theta_{err} \cdot \sin(\beta) \cdot \cos(3\theta) + 3\theta_{err} \cdot \cos(\beta) \cdot \sin(3\theta) \tag{4}$$

Herein, when defined as in the following equations (5) and (6), Equation (4) becomes the following Equation (7).

$$\theta_{amp\_cos} = 3\theta_{err} \cdot \sin(\beta) \tag{5}$$

$$\theta_{amp\_sin} = 3\theta_{err} \cdot \cos(\beta) \tag{6}$$

$$3\theta_r = 3\theta + \theta_{amp\_cos} \cdot \cos(3\theta) + \theta_{amp\_sin} \cdot \sin(3\theta) \tag{7}$$

When the first tripled angle signal $3\theta_r$ includes an error with respect to the motor angle of rotation $\theta$, as expressed in Equation (2), an angle difference $\Delta\theta2$, which is a difference between the second tripled angle signal $3\theta_{r2}$ and $3\theta$, which is a value wherein the motor angle of rotation $\theta$ is tripled, is as in the following Equation (8), based on Equations (3) and (7).

$$\Delta\theta2 = (es + \theta_{amp\_cos}) \cdot \cos(3\theta) + (-ec + \theta_{amp\_sin}) \cdot \sin(3\theta) \tag{8}$$

Therefore, $\Delta\theta2$ is zero when the following Equations (9) and (10) are satisfied.

$$es = -\theta_{amp\_cos} \tag{9}$$

$$ec = \theta_{amp\_sin} \tag{10}$$

Herein, it is understood from Equations (4) and (5) that $\theta_{amp\_cos}$ is a component synchronous with cos $(3\theta)$ of the angle error expressed by the second item on the right side of Equation (2), because of which the component synchronous with $\cos(3\theta)$ of the angle error can be controlled to zero by calculating the component (a component synchronous with the second sine wave signal $C(3\theta_r)$), and determining the first offset correction value es, which is the offset correction value of the first sine wave signal $S(3\theta_r)$, so as to satisfy Equation (9).

In the same way, it is understood from Equations (4) and (6) that $\theta_{amp\_sin}$ is a component synchronous with sin $(3\theta)$ of the angle error expressed by the second item on the right side of Equation (2), because of which the component synchronous with $\sin(3\theta)$ of the angle error can be controlled to zero by calculating the component (a component synchronous with the first sine wave signal $S(3\theta_r)$), and determining the second offset correction value ec, which is the offset correction value of the second sine wave signal $C(3\theta_r)$, so as to satisfy Equation (10).

Therefore, in the first embodiment, the n-fold angle error $\Delta\theta$, which is the difference between the second tripled angle signal $3\theta_{r2}$ and the high cutoff frequency angle signal $\theta_0$, is extracted. Further, as an angle error component is removed by the low-pass filter 106b, the high cutoff frequency angle signal $\theta_0$ coincides with triple the motor angle of rotation $\theta$ $(3\theta)$. Herein, when the extracted n-fold angle error $\Delta\theta$ is given by the following Equation (11), that is, when $$\Delta\theta = \theta \cos 0 \cdot \cos(\theta_0) + \theta \sin 0 \cdot \sin(\theta_0) \tag{11},$$

it is understood from Equation (11) that as the n-fold angle error $\Delta\theta$ when the high cutoff frequency angle signal $\theta_0$ is 0 degrees coincides with $\theta \cos 0$ when $\sin(\theta_0)$ is 0 and $\cos(\theta_0)$ is 1, the n-fold angle error $\Delta\theta$ (or more precisely the inverted sign value $-\Delta\theta$ of the n-fold angle error) when $\theta_0$ is 0 degrees is removed in the first switch 106h, as a result of which $-\Delta\theta_0$ is integrated using the second integrator 106j, and adopted as the first offset correction value es, in order to extract θ cos 0 (a component synchronous with the second sine wave signal C(3θ$_r$)) from the n-fold angle error Δθ.

Herein, when looking at the amplitude (es+θ$_{amp\_cos}$) relating to cos(3θ) of Equation (8), the amplitude (es+θ$_{amp\_cos}$) decreases owing to the first offset correction value es being caused to increase from 0 to a sign differing from that of θ$_{amp\_cos}$. Therefore, when θ cos 0 has a positive sign owing to an action of the second integrator 106j, the first offset correction value es decreases, acting in a direction that reduces θ cos 0, and when θ cos 0 has a negative sign, the first offset correction value es increases, acting in a direction that increases θ cos 0. Therefore, θ cos 0 eventually converges on the first offset correction value es, which coincides with 0. Consequently, a component synchronous with cos (θ$_0$) included in the n-fold angle error Δθ converges on zero.

In the same way, it is understood from Equation (11) that as the n-fold angle error Δθ when θ$_0$ is 90 degrees coincides with θ sin 0 when cos(θ$_0$) is 0 and sin(θ$_0$) is 1, the n-fold angle error Δθ when θ$_0$ is 90 degrees is removed in the second switch 106i, as a result of which Δθ$_{90}$ is integrated using the third integrator 106k, and adopted as the second offset correction value ec, in order to extract θ sin 0 (a component synchronous with the first sine wave signal S(3θ$_r$)) from the n-fold angle error Δθ. Herein, when looking at the amplitude (−ec+θ$_{amp\_sin}$) relating to sin(3θ) of Equation (8), the amplitude (−ec+θ$_{amp\_sin}$) decreases owing to the second offset correction value ec being caused to increase from 0 to θamp_sin, with the same sign. Therefore, owing to an action of the first second integrator 106j, the third integrator 106k acts in a direction that reduces θ cos 0 by increasing the second offset correction value ec when θ cos 0 has a positive sign, and when θ cos 0 has a negative sign, the second offset correction value es decreases, acting in a direction that increases θ cos 0. Therefore, θ sin 0 eventually converges on the second offset correction value ec, which coincides with 0. Consequently, a component synchronous with sin(θ$_0$) included in the n-fold angle error Δθ converges on zero.

Figure 8:
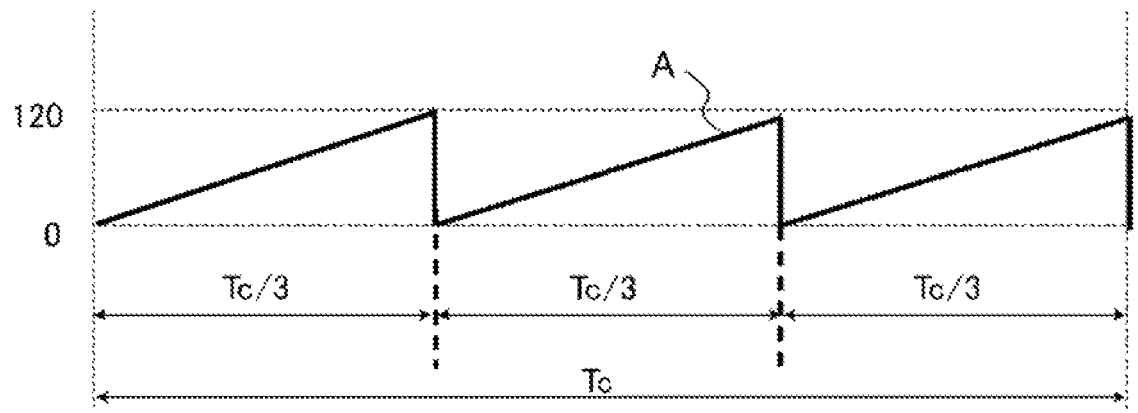
FIG. 8 is a drawing illustrating an advantage of the angle detection device according to the first embodiment.
Figure 9:
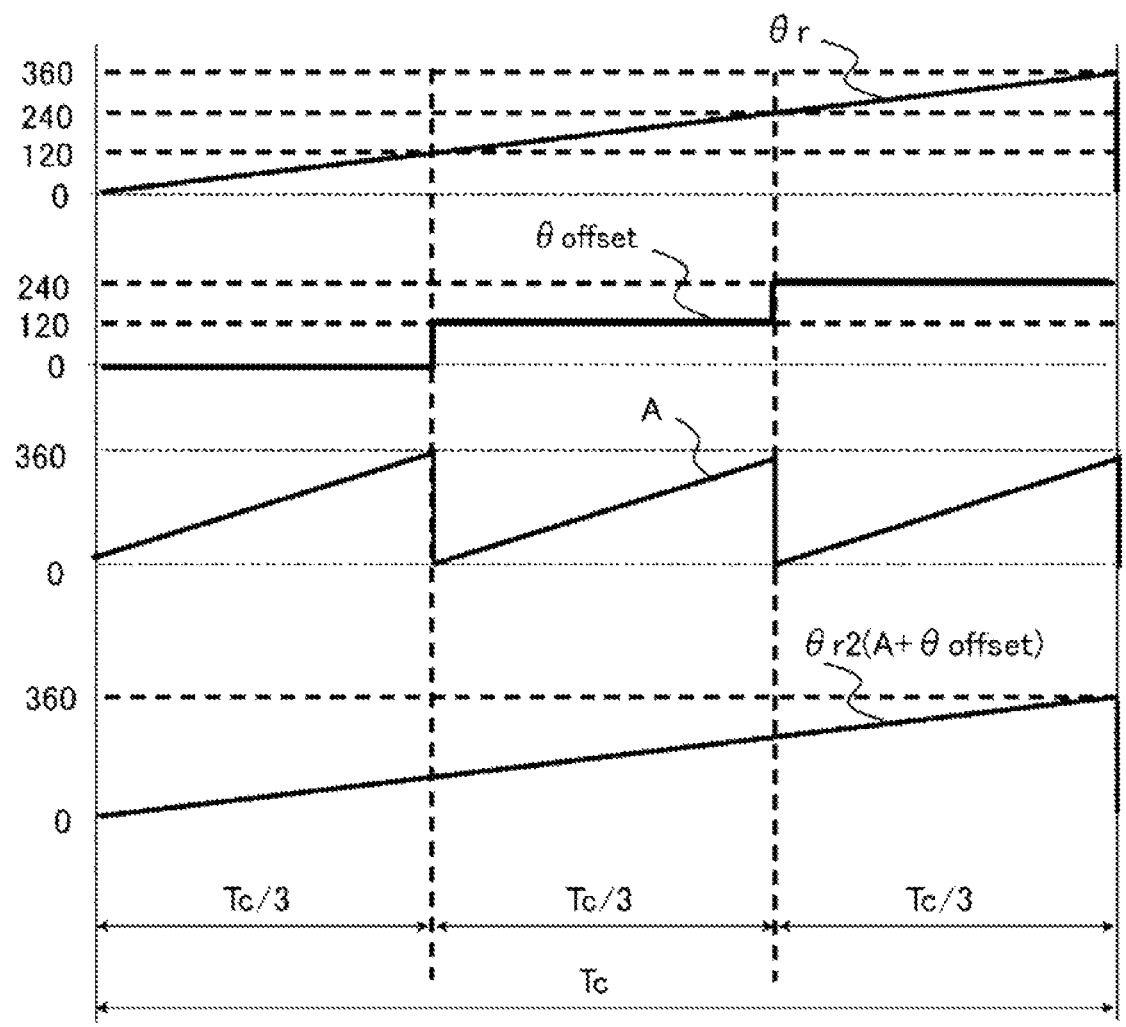
FIG. 9 is a drawing illustrating an advantage of the angle detection device according to the first embodiment.

As heretofore described, the first offset correction value es and the second offset correction value ec are determined so that the n-fold angle error Δθ converges on zero. The n-fold angle error Δθ converging on zero means that a component fluctuating at a frequency triple that of the motor angle of rotation θ has been removed from the second tripled angle signal 3θ$_{r2}$. Further, by the second tripled angle signal 3θ$_{r2}$ being multiplied in the second multiplier 107, the second tripled angle signal 3θ$_{r2}$ becomes an angle signal (defined as a signal A) that increases from 0 to 120 degrees in a cycle T$_e$/3, as shown in FIG. 8. Next, as shown in FIG. 9, an offset angle θ$_{offset}$ is calculated based on the angle signal θ$_r$ in the offset angle calculator 108, and the detected angle value θ$_{r2}$ is obtained by the offset angle θ$_{offset}$ and the signal A being added. Although the detected angle value θ$_{r2}$ has the same cycle as the angle signal θ$_r$, the detected angle value θ$_{r2}$ is a signal from which an error component fluctuating at a frequency triple that of the motor angle of rotation θ included in the angle signal θ$_r$ has been removed by an operation of the heretofore spread angle corrector 10.

According to the angle detection device 100A according to the first embodiment, as heretofore described, an error component fluctuating at a frequency triple that of the motor angle of rotation θ included in the angle signal θ$_r$ can be removed. Also, an amount of correction is an offset correction value, and regularly an amount of direct current, because of which no error caused by phase deviation occurs, even when there is dead time in calculating the offset correction value. Consequently, a low-priced CPU (central processing unit) with a low operating speed can be used because of the angle detection device 100A according to this embodiment.

In this embodiment, a method whereby an error component fluctuating at a frequency triple that of the motor angle of rotation θ included in the angle signal θ$_r$ is removed by tripling the angle signal θ$_r$ has been described, but it goes without saying that a configuration such that an error component fluctuating at a frequency n times that of the motor angle of rotation θ included in the angle signal θ$_r$ is removed by multiplying the angle signal θ$_r$ by n (n is a real number other than 1) can be adopted.

Second Embodiment

Next, an angle detection device according to a second embodiment will be described.

An angle detection device according to the second embodiment is such that only an offset correction value calculator differs from that in the first embodiment, and other portions are the same as in the first embodiment. Consequently, an offset correction value calculator will be described here.

Figure 10:
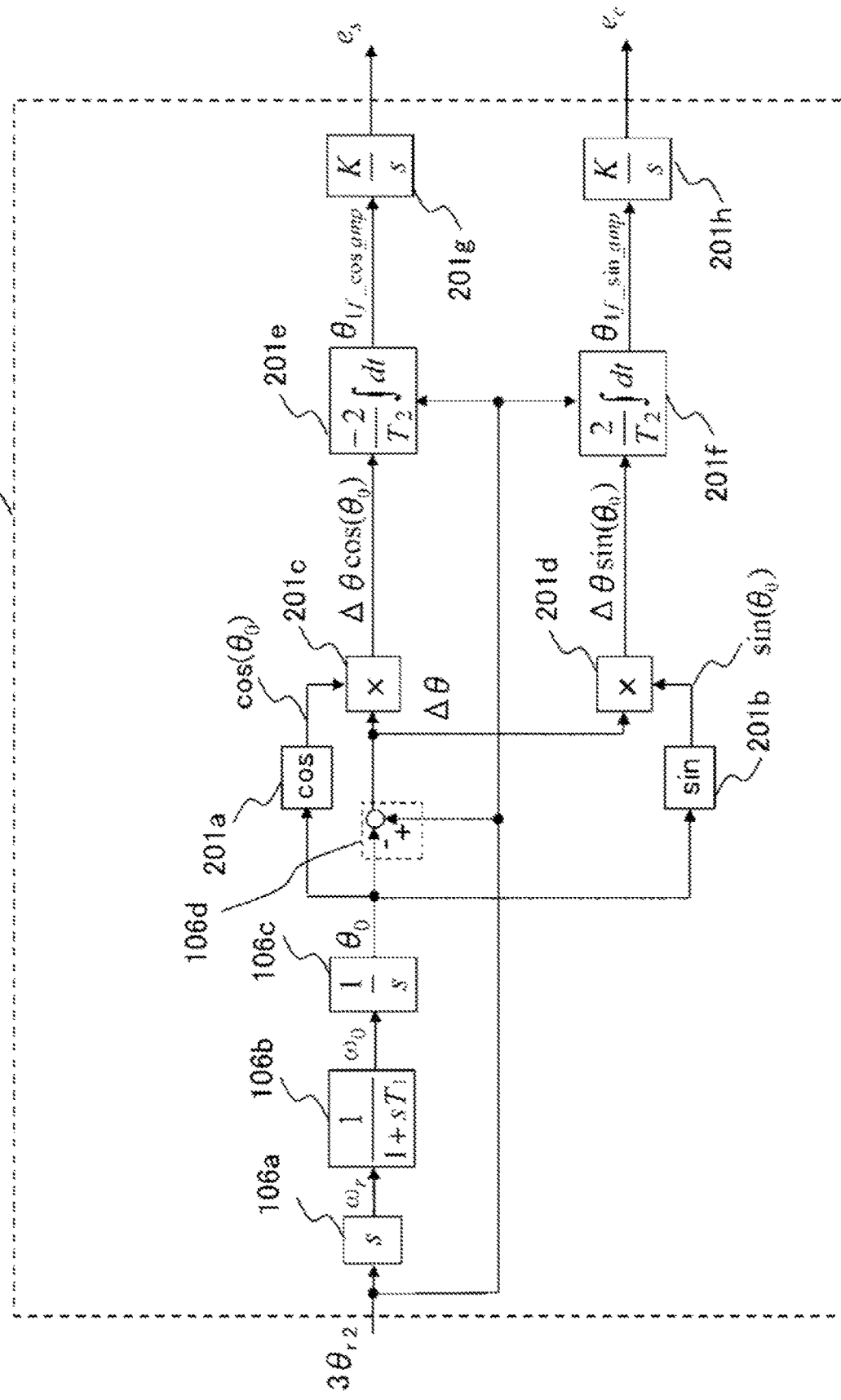
FIG. 10 is a drawing illustrating a function of an offset correction value calculator of an angle detection device according to a second embodiment.

FIG. 10 is a drawing illustrating an overall configuration of an offset correction value calculator of an angle detection device according to the second embodiment. An offset correction value calculator 201 according to the second embodiment includes the differentiator 106a, the low-pass filter 106b, the first integrator 106c, and the subtractor 106d. Furthermore, the offset correction value calculator 201 includes a cosine value calculator 201a, a sine value calculator 201b, a first multiplier 201c, a second multiplier 201d, a second integrator 201e, a third integrator 201f, a fourth integrator 201g, and a fifth integrator 201h.

The differentiator 106a, the low-pass filter 106b, the first integrator 106c, and the subtractor 106d have the same functions as in the offset correction value calculator 106 described in the first embodiment. The cosine value calculator 201a calculates the cosine value cos(θ$_0$) with respect to the high cutoff frequency angle signal θ$_0$. In the same way, the sine value calculator 201b calculates the sine value sin(θ$_0$) with respect to the high cutoff frequency angle signal θ$_0$.

Also, the first multiplier 201c multiplies the cosine value cos(θ$_0$) and the n-fold angle error Δθ, thereby calculating Δθ cos(θ$_0$). In the same way, the second multiplier 201d multiplies the sine value sin(θ$_0$) and the n-fold angle error Δθ, thereby calculating Δθ sin(θ$_0$). The second integrator 201e carries out an operation of the following equation (12) with respect to Δθ cos(θ$_0$), thereby calculating a cosine component θ$_{1f\_cos\_amp}$ of the high cutoff frequency angle signal θ$_0$ of the inverted sign value −Δθ of the n-fold angle error. Herein, T2 is a cycle of the second tripled angle signal 3θ$_{r2}$.

Math. 1

$$\theta_{1f\_cos\_amp} = -\frac{2}{T_2} \int_{-T_2/2}^{T_2} \Delta\theta \cos(\theta_0)\, dt \quad (12)$$

In the same way, the third integrator 201f carries out an operation of the following equation (13) with respect to Δθ sin(θ$_0$), thereby calculating a sine component θ$_{1f\_sin\_amp}$ of the high cutoff frequency angle signal θ$_0$ of the n-fold angle error Δθ. Herein, the cycle T2 of the second tripled angle signal 3θ$_{r2}$ is of the same value as in Equation (7).

Math. 2

$$\theta_{1f\_sin\_amp} = \frac{2}{T_2} \int_{-T_2/2}^{T_2} \Delta\theta \sin(\theta_0)\, dt \quad (13)$$

Further, the second integrator 201e inputs the cosine component θ$_{1f\_cos\_amp}$ of the inverted sign value −Δθ of the n-fold angle error into the fourth integrator 201g, and the third integrator 201f inputs the sine component θ$_{1f\_sin\_amp}$ of the n-fold angle error Δθ into the fifth integrator 201h. The fourth integrator 201g integrates θ$_{1f\_cos\_amp}$, and outputs a value thereof as the first offset correction value es. In the same way, the fifth integrator 201h integrates θ$_{1f\_sin\_amp}$, and outputs a value thereof as the second offset correction value ec. Herein, K is feedback gain, and it is sufficient that this is determined in the same way as in the first embodiment.

Next, advantages of the angle detection device according to the second embodiment will be described.

In the first embodiment, a case wherein the angle signal θ$_r$ is expressed by Equation (1) has been considered, but in actuality, there are also cases wherein a component of another order is included. For example, a case wherein the angle signal θ$_r$ is such that an amplitude θ$_{err2}$ of a component that fluctuates at a frequency twice that of the motor angle of rotation θ is included in the angle signal θ$_r$ will be considered with respect to Equation (1), as shown in the following Equation (14).

$$\theta_r = \theta + \theta_{err} \cdot \sin(3\theta + \beta) + \theta_{err2} \cdot \sin(2\theta + \gamma) \quad (14)$$

In this case, when attempting to obtain the high cutoff frequency angle signal θ$_0$ using the subtractor 106d of the offset correction value calculator 106 in the first embodiment shown in FIG. 6, an extraction error occurs when extracting the component of the second item on the right side, which is originally to be extracted, due to an effect of the newly added third item on the right side of Equation (13), and a problem occurs in that an error component that fluctuates at a frequency triple that of the motor angle of rotation θ included in the angle signal θ$_r$ cannot be correctly removed. In the second embodiment, therefore, as shown in FIG. 10, a configuration is such that only an amplitude of a component that fluctuates at a frequency triple that of the motor angle of rotation θ included in the angle signal θ$_r$ is extracted by an integrating operation (a Fourier series operation) using the second integrator 201e and the third integrator 201f in the offset correction value calculator 201, and the first offset correction value es and the second offset correction value ec are obtained using the fourth integrator 201g and the fifth integrator 201h in such a way that the amplitude becomes zero.

As heretofore described, the angle detection device according to the second embodiment is such that an unprecedented, notable advantage is achieved in that an angle error can be correctly extracted and reduced, even when a component other than a component to be extracted and reduced is included in an angle error existing with respect to the motor angle of rotation θ included in the angle signal θ$_r$.

Third Embodiment

Next, an angle detection device according to a third embodiment will be described.

An angle detection device according to the third embodiment is such that only an offset correction value calculator differs from that described in the second embodiment, and other portions are the same as in the first embodiment or the second embodiment. Consequently, an offset correction value calculator will be described here.

Figure 11:
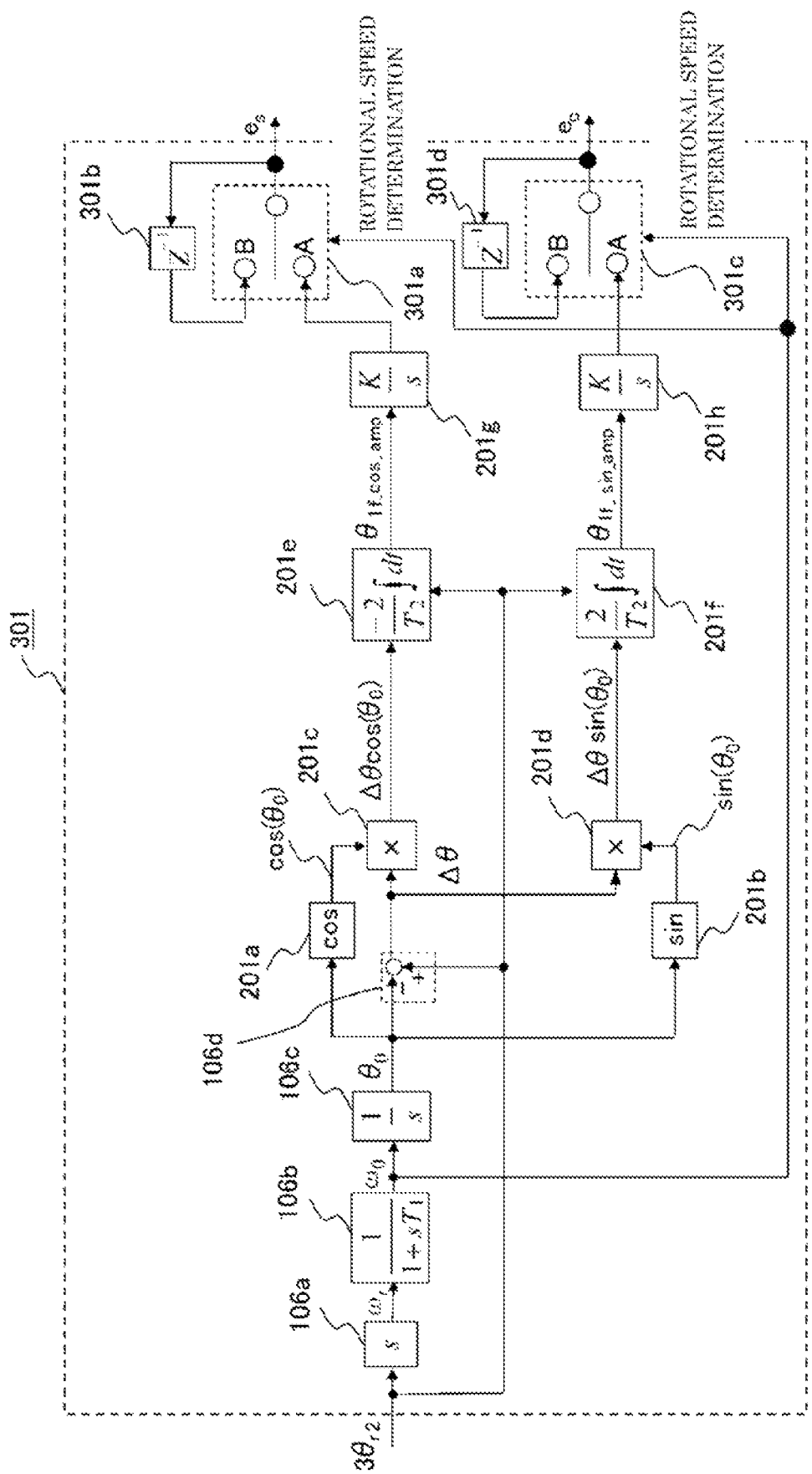
FIG. 11 is a drawing illustrating a function of an offset correction value calculator of an angle detection device according to a third embodiment.

FIG. 11 is a drawing illustrating an overall configuration of an offset correction value calculator of an angle detection device according to the third embodiment. An offset correction value calculator 301 according to the third embodiment is such that a third switch 301a and a third delayer 301b are provided in a stage subsequent to the fourth integrator 201g of the second embodiment, a fourth switch 301c and a fourth delayer 301d are provided in a stage subsequent to the fifth integrator 201h, and the first offset correction value es and the second offset correction value ec are updated when the second speed signal ω$_o$ is equal to or greater than a predetermined reference speed ω.

The third switch 301a and the fourth switch 301c have two inputs A and B, output the input A when it is determined that the second speed signal ω$_o$ is higher than the preset reference speed ω, and output the input B at other times. z shown in the third delayer 301b and the fourth delayer 301d is an operator representing a z-conversion, and the third delayer 301b and the fourth delayer 301d output an input signal of the offset correction value calculator 301 one operating cycle previously as an output signal.

Therefore, the third switch 301a outputs the input A, which is the output of the fourth integrator 201g, when it is determined that the second speed signal co is higher than the preset reference speed ω, and when this is not the case, the third switch 301a outputs the input B, which is the offset correction value es of one operating cycle previously. Therefore, the third switch 301a updates the offset correction value es when the second speed signal ω$_o$ is higher than the reference speed ω. In the same way, the fourth switch 301c outputs the input A, which is the output of the fifth integrator 201h, when it is determined that the second speed signal ω$_o$ is higher than the preset reference speed ω, and when this is not the case, the fourth switch 301c outputs the input B, which is the offset correction value ec of one operating cycle previously. Therefore, the fourth switch 301c updates the offset correction value ec when the second speed signal ω$_o$ is higher than the reference speed ω.

By a calculation of an offset correction value being carried out when the second speed signal ω$_o$ is higher than the reference speed co in this way, an error occurring in the offset correction value due to interference between a frequency of an angle error to be extracted and reduced and a rotating machine speed change frequency can be removed.

In particular, when the rotating machine is a motor for electric power steering, correction using an offset correction value can be effectively carried out by the reference speed co being set to a speed higher than a driver's steering wheel manipulation frequency.

Also, a number of calculations per rotation of the rotating machine decreases as the speed of the rotating machine increases, because of which offset correction value calculation accuracy decreases. Therefore, the third switch 301a, the fourth switch 301c, the third delayer 301b, and the fourth delayer 301d are provided, the input A is output from the third switch 301a and the fourth switch 301c when it is determined that the speed of the rotating machine is lower than the preset reference speed ω, and the input B is output at other times, whereby a setting can also be such that an offset correction value calculation is carried out when the speed of the rotating machine is equal to or lower than a predetermined value.

Fourth Embodiment

Next, an angle detection device according to a fourth embodiment will be described.

Figure 12:
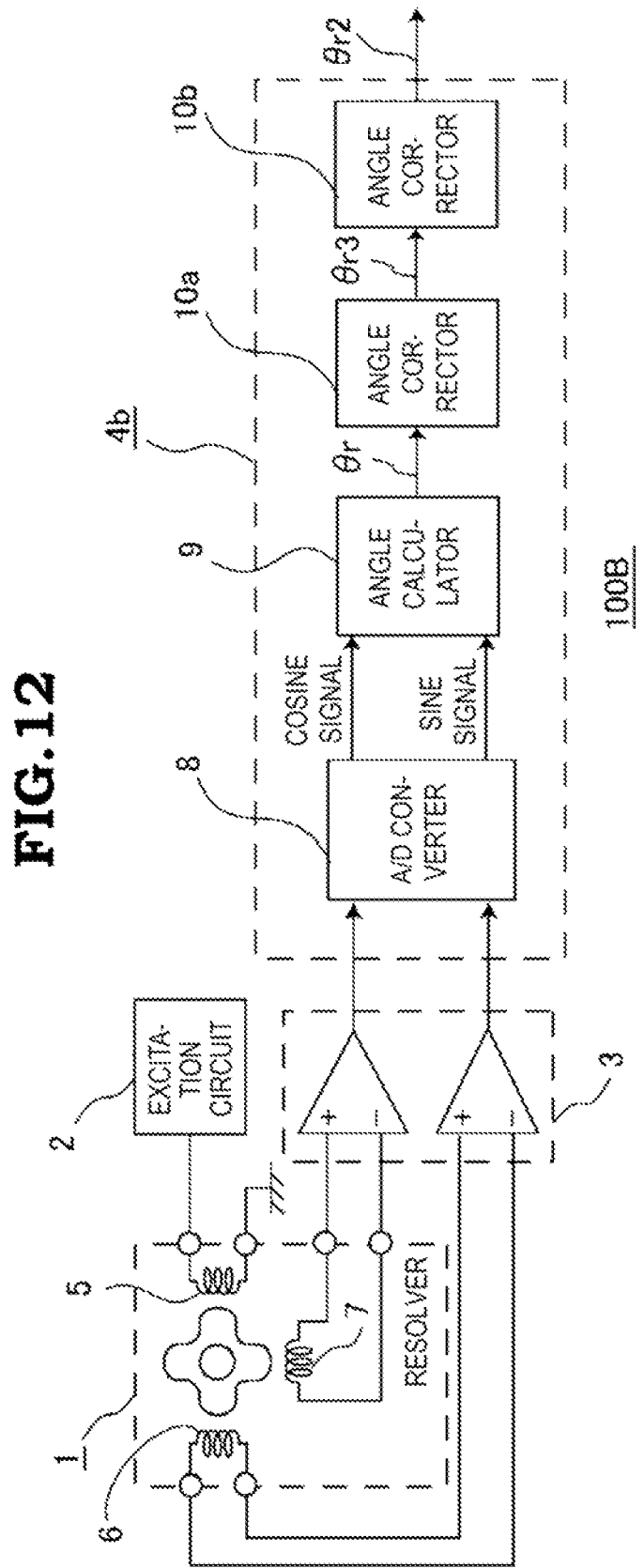
FIG. 12 is a block diagram showing a configuration of an angle detection device according to a fourth embodiment.

FIG. 12 is a block diagram showing a configuration of an angle detection device according to the fourth embodiment. As shown in FIG. 12, an angle detection device 100B according to the fourth embodiment is of a configuration such that an angle calculator differs from that of the angle detection device 100A described in the first to third embodiments.

In FIG. 12, angle calculating means 4b is of a configuration including a first angle corrector 10a and a second angle corrector 10b as angle correctors corresponding to the angle corrector 10 described in the first to third embodiments. A configuration of each of the first angle corrector 10a and the second angle corrector 10b is the same as that of the angle corrector 10 described in the first to third embodiments, but orders corrected differ.

For example, when the angle signal $θ_r$ output from the angle calculator 9 is expressed by Equation (13), an offset correction using the first sine wave signal $S(3θ_r)$ and the second sine wave signal $C(3θ_r)$ that are twice the angle signal $θ_r$ is carried out in the first angle corrector 10a, whereby a component that fluctuates at a frequency twice that of the motor angle of rotation θ is extracted, and a reduced angle signal $θ_{r3}$ is calculated.

Also, an offset correction using a third sine wave signal and a fourth sine wave signal, wherein the angle signal $θ_r$ is tripled, is carried out in the second angle corrector 10b, and a detected angle value $θ_{r2}$ from which a component that fluctuates at a frequency triple that of the motor angle of rotation θ has been extracted and removed is extracted.

A multiple of angle correctors (10a and 10b) being connected in series with respect to the angle signal $θ_r$, and the output thereof being adopted as the detected angle value $θ_{r2}$ in this way, means that even when multiple angle error components exist in the angle signal $θ_r$, the multiple of components can be extracted and removed.

Also, an offset correction calculator of the first angle corrector 10a and an offset correction calculator of the second angle corrector 10b being of the same configuration means that although inputs and outputs differ, calculations can be carried out using the same function, because of which an increase in a ROM (read-only memory) size can be restricted.

Herein, with regard to an order in which the multiple of angle correctors are caused to operate, operation is preferably started from the component of the lowest order (lowest frequency) of the angle error to be corrected. Therefore, when correcting m1 (m1 is a real number) and m2 (a real number satisfying m2>m1) components of an angle signal, the angle corrector relating to m1 is caused to operate first, after which the angle corrector relating to m2 is caused to operate. By so doing, an advantage is achieved in that extraction of the n-fold angle error Δθ caused by a difference with respect to the high cutoff frequency angle signal $θ_0$ can be carried out more accurately and in a high-speed region. In this embodiment, two angle correctors (10a and 10b) are connected in series, but it goes without saying that three or more angle correctors may be connected in series.

Fifth Embodiment

Next, an electric power steering device in which the angle detection device of any one of the first to fourth embodiments is used will be described as a fifth embodiment.

Although the angle detection devices 100A and 100B have been described in the first to fourth embodiments, an electric power steering device wherein torque that assists steering torque is generated based on the detected angle value $θ_{r2}$ obtained using the angle detection device 100A or 100B may also be configured.

Figure 13:
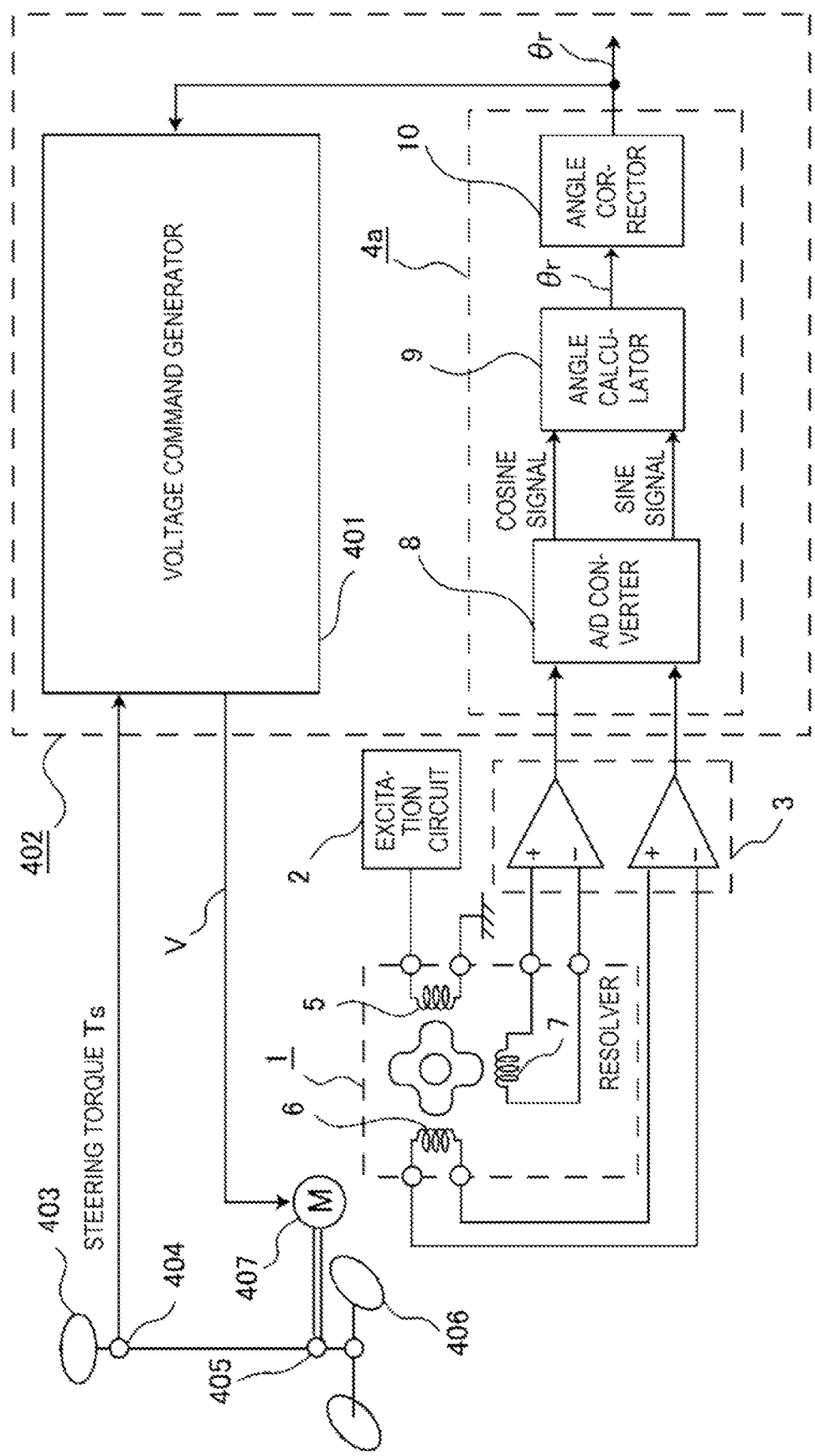
FIG. 13 is a drawing showing a configuration of an electric power steering device according to a fifth embodiment.

FIG. 13 is a drawing showing a configuration of an electric power steering device in which the angle detection device 100A described in the first embodiment is used. In the drawing, reference signs identical to those of the angle detection device 100A of the first embodiment indicate identical portions.

In FIG. 13, reference sign 401 indicates a voltage command generator, and an assist torque calculator 402 is configured of the voltage command generator 401 and the angle calculating means 4a. Also, reference sign 403 indicates a steering wheel, reference sign 404 indicates a torque detector, reference sign 405 indicates a gear, reference sign 406 indicates a front wheel, and reference sign 407 indicates an alternating current motor. In the following description, points differing from the first embodiment will be described.

A driver carries out steering of the front wheel 406 by causing the steering wheel 403 to rotate left and right. The torque detector 404 detects a steering torque Ts of a steering system, and outputs the detected torque to the assist torque calculator 402. In the voltage command generator 401, a voltage V is applied to the alternating current motor 407 based on the detected angle value $θ_{r2}$ and the steering torque Ts, and the alternating current motor 407 generates torque that assists the steering torque Ts via the gear 405.

The resolver 1 detects an angle of rotation θ of the alternating current motor 407. In the voltage command generator 401, it is sufficient that a current command value of the alternating current motor 407 is calculated based on, for example, the steering torque Ts, a voltage command is calculated using the current command value and the detected angle value $θ_{r2}$, and the voltage V is applied to the alternating current motor 407 using a power converter, such as an inverter, that has the calculated voltage command as an input. Alternatively, publicly known technology, such as separately providing a current detector that detects the current of the alternating current motor 407, and calculating a voltage command value based on a deviation between a current command value and the current flowing through the alternating current motor 407 detected by the current detector, may be used.

This kind of electric power steering device is such that accuracy of the detected angle value $θ_{r2}$ with respect to the angle of rotation θ of the alternating current motor 407 is important. For example, when an angle error with respect to the angle of rotation θ of the alternating current motor 407 occurs in the detected angle value $θ_{r2}$, the voltage command generator 401, based on this, applies the voltage V including the angle error, because of which a problem occurs in that torque ripple, vibration, abnormal noise, or the like, emanating from the alternating current motor 407 occurs. For the heretofore described reason, the electric power steering device is such that accuracy of the detected angle value $θ_{r2}$ with respect to the angle of rotation θ of the alternating current motor 407 is extremely important.

The electric power steering device according to the fifth embodiment is such that the angle signal $θ_r$ output from the angle calculator 9 is corrected to the detected angle value $θ_{r2}$ and output using the angle corrector 10, because of which advantages are obtained in that an angle error is restricted, and a quiet electric power steering device can be constructed.

Examples wherein the resolver 1 is used as an angle detector have been described in the first to fifth embodiments, but it goes without saying that the same advantages are obtained when using an angle detector that outputs a sine signal and a cosine signal with respect to a motor angle of rotation, for example, an MR sensor or an encoder.

Also, examples wherein a motor angle of rotation is detected as an angle detection target have been described in the first to fifth embodiments, but it goes without saying that the same advantages are obtained when an angle of rotation of a rotating body other than a motor is detected.

Although the present application is described in terms of various exemplifying embodiments and implementations, the various features, aspects, and functions described in one or a multiple of the embodiments are not limited in their applicability to a particular embodiment, but instead can be applied, alone or in various combinations, to other embodiments.

It is therefore understood that numerous modifications that have not been exemplified can be devised without departing from the scope of the present application. For example, at least one constituent component may be modified, added, or eliminated, and furthermore, at least one constituent component may be extracted and combined with the constituent components of another embodiment.

REFERENCE SIGNS LIST

1 resolver, 2 excitation circuit, 3 differential amplifier, 4a, 4b angle calculating means, 5 excitation coil, 6 sine detecting coil, 7 cosine detecting coil, 8 A/D converter, 9 angle calculator, 10 angle corrector, 10a first angle corrector, 10b second angle corrector, 100A, 100B angle detection device, 101, 201c first multiplier, 102 sine unit, 103 cosine unit, 104 adder, 105 tripled angle calculator, 106, 201, 301 offset correction value calculator, 106a differentiator, 106b low-pass filter, 106c first integrator, 106d subtractor, 106e gain unit, 106f first delayer, 106g second delayer, 106h first switch, 106i second switch, 106j, 201e second integrator, 106k, 201f third integrator, 107, 201d second multiplier, 108 offset angle calculator, 201a cosine value calculator, 201b sine value calculator, 201g fourth integrator, 201h fifth integrator, 301a third switch, 301b third delayer, 301c fourth switch, 301d fourth delayer, 401 voltage command generator, 402 assist torque calculator, 403 steering wheel, 404 torque detector, 405 gear, 406 front wheel, 407 alternating current motor, P processor, M storage device, es first offset correction value, ec second offset correction value, $S(θ)$ sine signal, $C(θ)$ cosine signal, θ angle of rotation, $θ_r$, $θ_{r3}$ angle signal, $θ_{r2}$ detected angle value, $3θ_r$ first tripled angle signal, $S(3θ_r)$ first sine wave signal, $C(3θ_r)$ second sine wave signal, $3θ_{r2}$ second tripled angle signal, $ω_r$ first speed signal, coo second speed signal, co reference speed, $θ_0$ high cutoff frequency angle signal, Δθ n-fold angle error, $θ_{offset}$ offset angle, Ts steering torque.

The invention claimed is:

1. An angle detection device that outputs a detected angle value from an angle signal of a rotating body, comprising:
an angle corrector that carries out each of an operation obtaining a first n-fold angle signal by multiplying the angle signal by n, wherein n is a real number other than 1, an operation obtaining, based on the first n-fold angle signal, a first sine wave signal and a second sine wave signal of mutually differing phases, an operation obtaining a second n-fold angle signal based on the first sine wave signal and the second sine wave signal, an operation obtaining a first offset correction value, wherein the first offset correction value is an offset correction value of the first sine wave signal, based on the second n-fold angle signal and obtaining a second offset correction value, wherein the second offset correction value is an offset correction value of the second sine wave signal, based on the second n-fold angle signal, and an operation correcting the second n-fold angle signal based on the first sine wave signal corrected by the first offset correction value and the second sine wave signal corrected by the second offset correction value, wherein
the angle correction device outputs, to a voltage command generator, the detected angle value based on the corrected second n-fold angle signal, wherein the voltage command generator is configured to output a voltage to control a power steering torque.

2. The angle detection device according to claim 1, wherein
the angle corrector calculates the first offset correction value by obtaining a component synchronous with the second sine wave signal included in the second n-fold angle signal, and
calculates the second offset correction value by obtaining a component synchronous with the first sine wave signal included in the second n-fold angle signal.

3. The angle detection device according to claim 2, wherein
the angle corrector calculates an n-fold angle error such that a frequency component lower than a frequency of a basic wave component of the first sine wave signal has been removed from the first n-fold angle signal and a frequency component equal to or higher than the frequency of the basic wave component of the first sine wave signal has been extracted, and
obtains a component synchronous with the first sine wave signal and a component synchronous with the second sine wave signal from the n-fold angle error.

4. The angle detection device according to claim 1, wherein
the angle corrector outputs the detected angle value by multiplying the second n-fold angle signal by 1/n and adding an offset angle in accordance with a value range of the angle signal.

5. The angle detection device according to claim 1, wherein
the angle corrector updates the first offset correction value and the second offset correction value when the frequency of the basic wave component of the first sine wave signal is higher than a rotational speed fluctuation band of the rotating body.

6. The angle detection device according to claim 2, wherein
the angle corrector outputs the detected angle value by multiplying the second n-fold angle signal by 1/n and adding an offset angle in accordance with a value range of the angle signal.

7. The angle detection device according to claim 3, wherein
the angle corrector outputs the detected angle value by multiplying the second n-fold angle signal by 1/n and adding an offset angle in accordance with a value range of the angle signal.

8. The angle detection device according to claim 2, wherein
the angle corrector updates the first offset correction value and the second offset correction value when the frequency of the basic wave component of the first sine wave signal is higher than a rotational speed fluctuation band of the rotating body.

9. The angle detection device according to claim 3, wherein
the angle corrector updates the first offset correction value and the second offset correction value when the frequency of the basic wave component of the first sine wave signal is higher than a rotational speed fluctuation band of the rotating body.

10. The angle detection device according to claim 4, wherein
the angle corrector updates the first offset correction value and the second offset correction value when the frequency of the basic wave component of the first sine wave signal is higher than a rotational speed fluctuation band of the rotating body.

11. An angle detection device that outputs a detected angle value from an angle signal of a rotating body, comprising:
a first angle corrector that carries out each of an operation obtaining a first m1-fold angle signal by multiplying the angle signal by m1, wherein m1 is a real number, an operation obtaining, based on the first m1-fold angle signal, a first sine wave signal and a second sine wave signal of mutually differing phases, an operation obtaining a second m1-fold angle signal based on the first sine wave signal and the second sine wave signal, an operation obtaining a first offset correction value, wherein the first offset correction value is an offset correction value of the first sine wave signal, based on the second m1-fold angle signal and obtaining a second offset correction value, wherein the second offset correction value is an offset correction value of the second sine wave signal, based on the second m1-fold angle signal, and an operation correcting the second m1-fold angle signal based on the first sine wave signal corrected by the first offset correction value and the second sine wave signal corrected by the second offset correction value; and
a second angle corrector that carries out each of an operation obtaining a first m2-fold angle signal by multiplying an angle signal based on the second m1-fold angle signal by m2, wherein m2 is a real number that satisfies m2>m1, an operation obtaining, based on the first m2-fold angle signal, a third sine wave signal and a fourth sine wave signal of mutually differing phases, an operation obtaining a second m2-fold angle signal based on the third sine wave signal and the fourth sine wave signal, an operation obtaining a third offset correction value, wherein the third offset correction value is an offset correction value of the third sine wave signal, based on the second m2-fold angle signal and obtaining a fourth offset correction value, wherein the fourth offset correction value is an offset correction value of the fourth sine wave signal, based on the second m2-fold angle signal, and an operation correcting the second m2-fold angle signal based on the third sine wave signal corrected by the third offset correction value and the fourth sine wave signal corrected by the fourth offset correction value, wherein
the angle correction device outputs, to a voltage command generator, the detected angle value based on the corrected second m2-fold angle signal, wherein the voltage command generator is configured to output a voltage to control a power steering torque.

12. The angle detection device according to claim 11, wherein
the first angle corrector and the second angle corrector are of the same configuration.

13. An electric power steering device comprising:
an angle detection device that outputs a detected angle value from an angle signal of a rotating body, the angle detection device comprising:
an angle corrector that carries out each of an operation obtaining a first n-fold angle signal by multiplying the angle signal by n, wherein n is a real number other than 1, an operation obtaining, based on the first n-fold angle signal, a first sine wave signal and a second sine wave signal of mutually differing phases, an operation obtaining a second n-fold angle signal based on the first sine wave signal and the second sine wave signal, an operation obtaining a first offset correction value, wherein the first offset correction value is an offset correction value of the first sine wave signal, based on the second n-fold angle signal and obtaining a second offset correction value, wherein the second offset correction value is an offset correction value of the second sine wave signal, based on the second n-fold angle signal, and an operation correcting the second n-fold angle signal based on the first sine wave signal corrected by the first offset correction value and the second sine wave signal corrected by the second offset correction value, wherein
the angle correction device outputs, to the electric power steering device, the detected angle value based on the corrected second n-fold angle signal, and wherein:
the rotating body is an alternating current motor used in an electric power steering assist, and
the electric power steering control device applies a voltage to control a power steering torque.

14. The electric power steering device of claim 13, wherein
the angle corrector calculates the first offset correction value by obtaining a component synchronous with the second sine wave signal included in the second n-fold angle signal, and
calculates the second offset correction value by obtaining a component synchronous with the first sine wave signal included in the second n-fold angle signal.

15. The electric power steering device of claim 13, wherein
the angle corrector calculates an n-fold angle error such that a frequency component lower than a frequency of a basic wave component of the first sine wave signal has been removed from the first n-fold angle signal and a frequency component equal to or higher than the frequency of the basic wave component of the first sine wave signal has been extracted, and
obtains a component synchronous with the first sine wave signal and a component synchronous with the second sine wave signal from the n-fold angle error.

16. The electric power steering device of claim 13, wherein
the angle corrector outputs the detected angle value by multiplying the second n-fold angle signal by 1/n and adding an offset angle in accordance with a value range of the angle signal.

17. The electric power steering device of claim 13, wherein
the angle corrector updates the first offset correction value and the second offset correction value when the frequency of the basic wave component of the first sine wave signal is higher than a rotational speed fluctuation band of the rotating body.

18. An electric power steering device, comprising:
an angle detection device that outputs a detected angle value from an angle signal of a rotating body, the angle detection device comprising:
  a first angle corrector that carries out each of an operation obtaining a first m1-fold angle signal by multiplying the angle signal by m1, wherein m1 is a real number, an operation obtaining, based on the first m1-fold angle signal, a first sine wave signal and a second sine wave signal of mutually differing phases, an operation obtaining a second m1-fold angle signal based on the first sine wave signal and the second sine wave signal, an operation obtaining a first offset correction value, wherein the first offset correction value is an offset correction value of the first sine wave signal, based on the second m1-fold angle signal and obtaining a second offset correction value, wherein the second offset correction value is an offset correction value of the second sine wave signal, based on the second m1-fold angle signal, and an operation correcting the second m1-fold angle signal based on the first sine wave signal corrected by the first offset correction value and the second sine wave signal corrected by the second offset correction value; and
  a second angle corrector that carries out each of an operation obtaining a first m2-fold angle signal by multiplying an angle signal based on the second m1-fold angle signal by m2, wherein m2 is a real number that satisfies m2>m1, an operation obtaining, based on the first m2-fold angle signal, a third sine wave signal and a fourth sine wave signal of mutually differing phases, an operation obtaining a second m2-fold angle signal based on the third sine wave signal and the fourth sine wave signal, an operation obtaining a third offset correction value, wherein the third offset correction value is an offset correction value of the third sine wave signal, based on the second m2-fold angle signal and obtaining a fourth offset correction value, wherein the fourth offset correction value is an offset correction value of the fourth sine wave signal, based on the second m2-fold angle signal, and an operation correcting the second m2-fold angle signal based on the third sine wave signal corrected by the third offset correction value and the fourth sine wave signal corrected by the fourth offset correction value,
wherein:
  the angle correction device outputs, to the electric power steering device, the detected angle value based on the corrected second m2-fold angle signal,
  the rotating body is an alternating current motor used in an electric power steering assist, and
  the electric power steering control device applies a voltage to control a power steering torque.

19. The electric power steering device of claim 18, wherein the first angle corrector and the second angle corrector are of the same configuration.

* * * * *